US006210028B1

(12) United States Patent
Murakoshi et al.

(10) Patent No.: US 6,210,028 B1
(45) Date of Patent: Apr. 3, 2001

(54) VEHICULAR HEADLAMP HAVING SYNTHETIC RESIN LENS WITH REDUCED DISCOLORATION AND CRACKING FROM ULTRAVIOLET RADIATION

(75) Inventors: Mamoru Murakoshi; Toshiaki Tsuda, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/361,114

(22) Filed: Jul. 27, 1999

(30) Foreign Application Priority Data

Aug. 7, 1998 (JP) .................................................. 10-224317

(51) Int. Cl.$^{7}$ ........................................................ B60Q 1/00

(52) U.S. Cl. ............................................ 362/538; 313/112

(58) Field of Search ..................................... 362/507, 516, 362/538, 539, 459; 313/112, 489, 635; 359/361

(56) References Cited

U.S. PATENT DOCUMENTS 5,130,904 * 7/1992 Ohshio ................................ 362/516
5,132,881 7/1992 Wakimizu et al. .................. 362/539
5,180,218 1/1993 Ohshio ................................ 362/538
5,214,345 * 5/1993 Saito .................................. 313/112
5,228,766 * 7/1993 Makita ................................ 362/538
5,243,501 9/1993 Makita et al. ....................... 362/510
5,343,370 * 8/1994 Ohashi ................................ 362/459
5,394,050 * 2/1995 Aoyama .............................. 313/112

* cited by examiner

*Primary Examiner*—Sandra O'Shea
*Assistant Examiner*—Hargobind S. Sawhney
(74) *Attorney, Agent, or Firm*—Sughrue, Mion, Zinn, Macpeak & Seas, PLLC

(57) ABSTRACT

A projection-type headlamp for an automotive vehicle including a projection lens made of glass through which light rays emitted from a discharge lamp bulb are radiated to an outer lens made of a synthetic resin. An ultraviolet absorbing film made solely of zinc oxide is formed on the inner surface of the projection lens, which film prevents discoloration (yellowing) and deterioration (cracking) of the outer lens due to ultraviolet irradiation from the discharge bulb. A protective film is provided over the ultraviolet absorbing film so as to retain the ultraviolet absorbing function of the latter for an extended service period.

8 Claims, 2 Drawing Sheets

VEHICULAR HEADLAMP HAVING SYNTHETIC RESIN LENS WITH REDUCED DISCOLORATION AND CRACKING FROM ULTRAVIOLET RADIATION

BACKGROUND OF THE INVENTION

The present invention relates to a vehicular headlamp, particularly, to a projection-type headlamp. More particularly, the present invention relates to a headlamp employing a synthetic resin lens in which the lens is protected over an extended service period against discoloration (yellowing) and other problems such as cracking caused by ultraviolet irradiation from a light source.

In order to configure a vehicular headlamp so that it conforms to the overall vehicle design, the outer lens, which greatly affects the vehicle appearance, is often required to have a complicated design. When using an outer lens made of glass, the weight of a large-sized lamp unit, which is a combination of many components, is high. In order to solve the aforementioned problem, an outer lens made of a synthetic resin material has been increasingly employed as it can be more readily formed into a required shape and is lighter in weight than an outer lens made of glass.

However, a synthetic resin lens is susceptible to damage by ultraviolet radiation. That is, when such a lens is exposed to ultraviolet radiation for a long period of time, discoloration or cracking is likely to occur.

Particularly, a discharge bulb emits large amounts of ultraviolet radiation. As a result, in a headlamp employing such a bulb as a light source, it is important to take measures to protect the synthetic resin lens from exposure to such ultraviolet radiation.

In one type of conventional vehicular headlamp using a discharge lamp bulb as a light source, for example, a projection-type headlamp, an ultraviolet absorbing film is formed on the inner surface of the projection lens of the projection unit. The ultraviolet absorbing film absorbs ultraviolet radiation contained in the light rays emitted by the discharge lamp bulb so as to protect the synthetic resin lens from exposure to ultraviolet radiation.

FIG. 3 shows a conventional projection lens, the inner surface of which is coated with a ultraviolet absorbing film. More specifically, as illustrated in FIG. 3, an ultraviolet absorbing film c is formed on the inner surface b of a projection lens a. The ultraviolet absorbing film c is formed by applying a coating film (paint), which is prepared by kneading zinc oxide e with a resin d as a base material, on the inner surface b. In FIG. 3, the thickness of the ultraviolet absorbing film c is shown exaggerated relative to the other components.

The conventional projection lens a having an ultraviolet absorbing film c coated on the inner surface thereof, however, suffers from various problems. For example, the ultraviolet absorbing film c will deteriorate after use for a long period of time owing to the low heat resistance of the base resin d constituting the coating film, thus losing its ultraviolet absorbing effect. The projection lens a has rather low transparency as the ultraviolet absorbing film c contains resin, thus deteriorating the light distributing control properties of the lens. Furthermore, as the viscosity of the base resin d has to be made high so as to cause the paint to adequately adhere to the lens, spots tend to be formed in the ultraviolet absorbing film c due to an uneven thickness.

SUMMARY OF THE INVENTION

It is an object of the present invention to overcome the aforementioned problems such that deterioration of the synthetic resin lens, such as yellowing or cracking, caused by ultraviolet radiation from the light source is prevented, and the preventive function is maintained for an extended service period.

In order to realize the foregoing and other objects, the present invention provides a vehicular headlamp having a synthetic resin lens through which light rays emitted from a light source are radiated through a glass lens, in which an ultraviolet absorbing film made solely of zinc oxide is formed on the inner surface of the glass lens.

In a vehicular headlamp constructed according to the present invention, ultraviolet radiation from the light source is absorbed by the ultraviolet absorbing film. The ultraviolet absorbing film is made solely of zinc oxide, which prevents deterioration of the ultraviolet absorbing film while retaining the ultraviolet absorbing effect for an extended service period.

DESCRIPTION OF THE PREFERRED EMBODIMENTS

Figure 1:
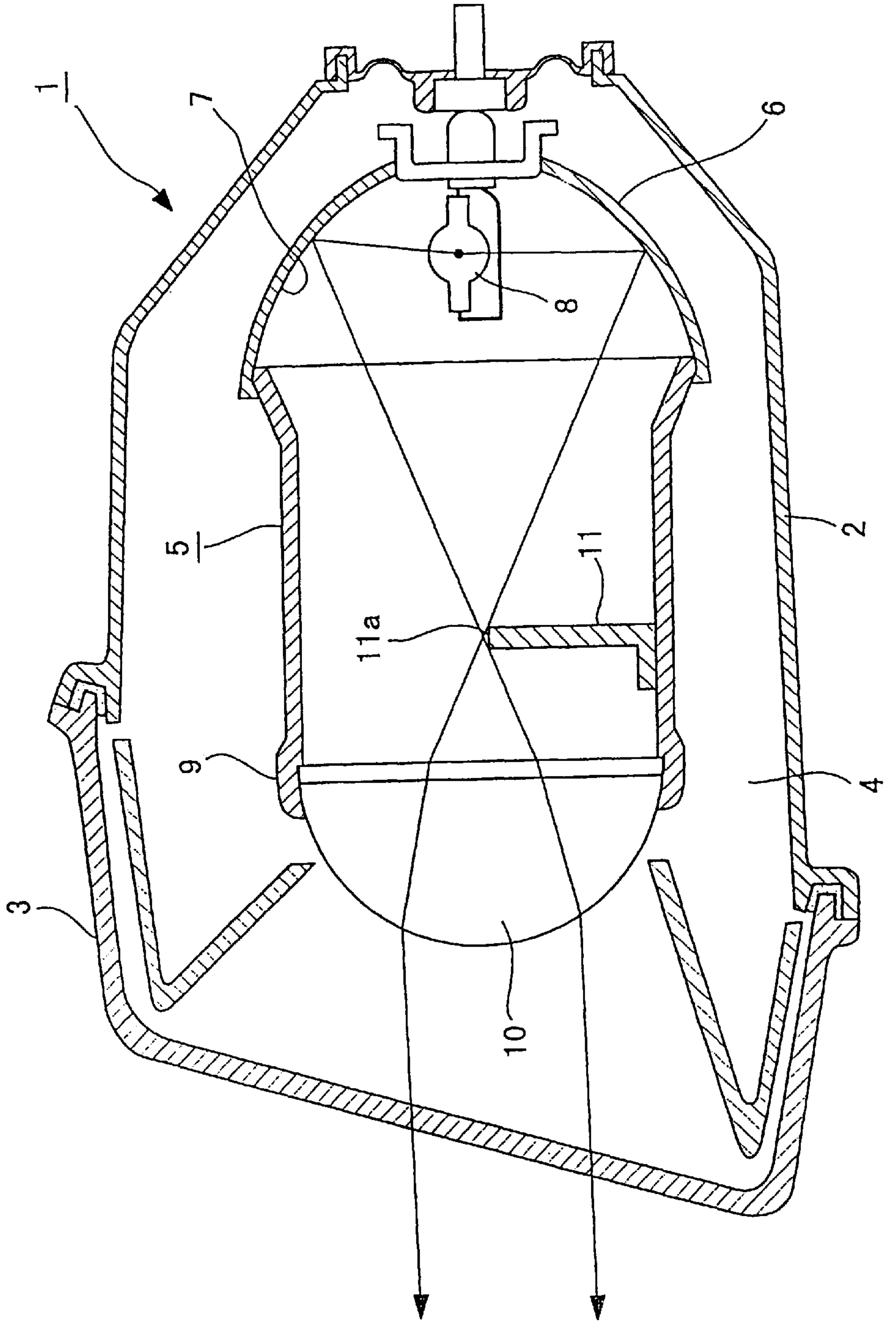
FIG. 1 is a schematic sectional view of a preferred embodiment of a headlamp constructed in accordance with the invention in the form of a projection-type headlamp.

Preferred embodiments of a vehicular headlamp constructed according to the present invention will be explained in detail referring to the attached drawings. The embodiment shown in the drawings has been obtained by applying the present invention to a projection-type vehicular headlamp.

FIG. 1 is a sectional view showing schematically the structure of a projection-type headlamp 1 for an automotive vehicle.

In the projection-type headlamp 1, a lamp chamber 4 is defined by a lamp housing 2 and an outer lens 3 that covers the front portion of the lamp housing 2. A light projection unit 5 is disposed within the lamp chamber 4. The outer lens 3 is formed of a transparent synthetic resin material.

The light projection unit 5, which is tiltably supported within the lamp housing 2, includes a reflector 6 having an elliptical reflecting surface 7. A discharge lamp bulb 8 serving as the light source is supported on the reflector 6.

A projection lens 10, which is a convex lens made of glass, is mounted forward of the reflector 6 and discharge lamp bulb 8 via a fitting ring 9. A shade 11 is disposed between the projection lens 10 and the reflecting surface 7.

Light rays radiated from the discharge lamp bulb 8 are reflected by the reflecting surface 7 and condensed around an edge 11*a* of the shade 11 so as to form a clear cut line prior to reaching the projection lens 10. The light rays are further projected forward through the outer lens 3.

Figure 2:
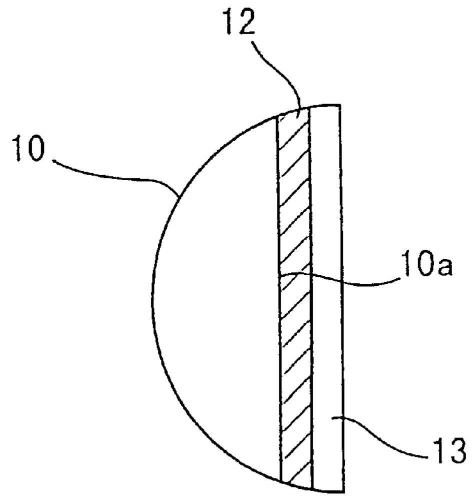
FIG. 2 is an enlarged sectional view of the projection lens of the headlamp of FIG. 1.
Figure 3:
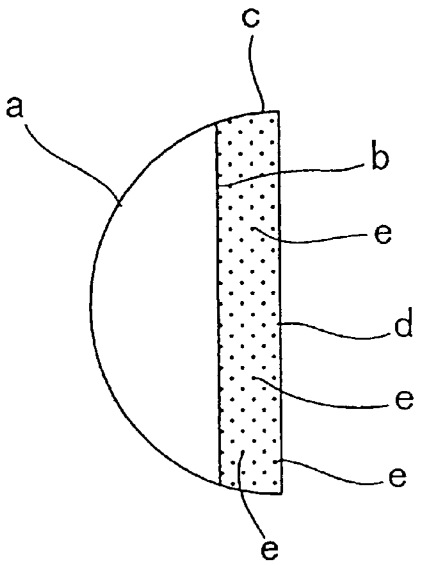
FIG. 3 PRIOR ART
FIG. 3 is an enlarged sectional view of a projection lens employed in a conventional headlamp.

As shown in FIG. 2, an ultraviolet absorbing film 12 and a protective film 13 are formed on the inner surface 10*a* of the projection lens 10. (In FIG. 2, for clarity of illustration, the thicknesses of the ultraviolet absorbing film 12 and the protective film 13 are shown larger than in the actual case.)

The aforementioned ultraviolet absorbing film 12 is formed as a thin film made solely of zinc oxide.

The ultraviolet absorbing film 12 made solely of zinc oxide was prepared in the following manner.

A paint obtained by dispersing zinc oxide in a solvent was applied to the rear surface 10*a* of the projection lens 10. The lens 10 was heated in a furnace so as to obtain the ultraviolet absorbing film 12 as a sintered film made solely of zinc oxide.

It is preferable to apply the paint by a spin coating method. Although a process such as a spray coating method can be easily conducted, such a method is likely to result in unevenness in the coated film. On the contrary, the spin coating method causes the film thickness to be uniform due to the action of centrifugal force, and further it allows the resultant film to be made substantially thin.

The sintering process was conducted in a furnace at a temperature of 500° C. for 30 minutes. This process evaporates the solvent completely to form the ultraviolet absorbing film 12 made solely of zinc oxide.

The aforementioned ultraviolet absorbing film 12 is made solely of zinc oxide and thus contains no resin, resulting in excellent heat resistance and a high transparency. Accordingly, the ultraviolet absorbing effect can be retained for a long time, thus preventing discoloration (yellowing) and other types of deterioration in the quality of the resin outer lens 3 for an extended service period.

It is preferable that the thickness of the aforementioned ultraviolet absorbing film 12 be in a range from 0.5 μm to 0.7 μm.

Endurance tests were carried out for polycarbonate resin outer lenses where light is projected therethrough from glass lenses having formed on their inner surface ZnO films of different thickness. The results are shown in the following Table 1:

TABLE 1

| | | ZnO Film Thickness (μm) | | | | | | |
|---|---|---|---|---|---|---|---|---|
| | | 0.2 | 0.3 | 0.4 | 0.5 | 0.6 | 0.7 | 0.8 |
| UV | 12.0 | ○ | ○ | ○ | ○ | ○ | ○ | * |
| Irradiation | 24.0 | ○ | ○ | ○ | ○ | ○ | ○ | |
| Amount | 36.0 | Δ | ○ | ○ | ○ | ○ | ○ | |
| kJ/cm$^2$) | 48.0 | X | Δ | Δ | ○ | ○ | ○ | |
| | 60.0 | X | X | X | ○ | ○ | ○ | |

○: No changes observed in the lens.
Δ: Moderate yellow discoloration observed in the polycarbonate resin.
X: Severe yellow discoloration observed in the polycarbonate resin.
*: Cracking observed during ZnO baking process, and the test was not completed.

Table 1 shows the results of tests for a headlamp having the structure shown in FIG. 1 with respect to ultraviolet absorbing films having respective thicknesses of 0.2 μm, 0.3 μm, 0.4 μm, 0.5 μm, 0.6 μm, 0.7 μm, and 0.8 μm. More specifically, Table 1 shows the conditions of lenses subjected to a test in which the integrated amount of ultraviolet irradiation from a 35 watt discharge lamp bulb at a wavelength in a range from 320 nm to 370 nm, which can cause polycarbonate resin to discolor or deteriorate, was 12.0 kJ/cm$^2$ (500 hours elapsing from start of the lamp), 24.0 kJ/cm$^2$ (elapse of 1,000 hours under the same conditions), 36.0 kJ/cm$^2$ (elapse of 1,500 hours under the same conditions), 48.0 kJ/cm$^2$ (elapse of 2,000 hours under the same conditions), and 60.0 kJ/cm$^2$ (elapse of 2,500 hours under the same conditions), respectively.

As indicated by Table 1, in the case where the thickness of the ultraviolet absorbing film 12 was 0.4 μm or less, yellow discoloration was observed in the outer lens 3 after use for an extended period. In the case where the film thickness of the ultraviolet absorbing film 12 was 0.8 μm or greater, cracking was observed in the film during the sintering process.

The protective film 13, which is provided to improve the chemical-resistance property of the ultraviolet absorbing film 12 against acid or alkali, is preferably a silicate film. For example, the protective film 13 can be prepared by applying a paint formed of a solvent containing a dispersion of silicon dioxide ($SiO_2$) over the ultraviolet absorbing film 12 using, for example, a spin coating method. Thereafter it is heated in a furnace at about 300° C. for 60 minutes such that the solvent is evaporated.

It is preferable that the thickness of the protective film 13 be in a range of 0.2 μm to 1.5 μm.

Table 2 shows the results of coating film endurance tests for protective films 13 of different film thicknesses.

TABLE 2

| | $SiO_2$ film thickness (μm) | | | | | | | | |
|---|---|---|---|---|---|---|---|---|---|
| Test Item | 0.1 | 0.2~ 0.3 | 0.4~ 0.5 | 0.6~ 0.7 | 0.8~ 0.9 | 1.0~ 1.1 | 1.2~ 1.3 | 1.4~ 1.5 | 1.6~ 1.7 |
| Appearance | ○ | ○ | ○ | ○ | ○ | ○ | ○ | ○ | ○ |
| Adhesion property | ○ | ○ | ○ | ○ | ○ | ○ | ○ | ○ | ○ |
| Humidity resistance | ○ | ○ | ○ | ○ | ○ | ○ | ○ | ○ | ○ |
| Hot water resistance | ○ | ○ | ○ | ○ | ○ | ○ | ○ | ○ | ○ |
| Heat resistance | ○ | ○ | ○ | ○ | ○ | ○ | ○ | ○ | X(1) |
| Alkali resistance | X(2) | ○ | ○ | ○ | ○ | ○ | ○ | ○ | ○ |
| Acid resistance | X(2) | ○ | ○ | ○ | ○ | ○ | ○ | ○ | ○ |
| Saline solution resistance | ○ | ○ | ○ | ○ | ○ | ○ | ○ | ○ | ○ |
| Thermal shock | ○ | ○ | ○ | ○ | ○ | ○ | ○ | ○ | ○ |

TABLE 2-continued

| Test Item | SiO$_2$ film thickness ($\mu$m) 0.1 | 0.2~ 0.3 | 0.4~ 0.5 | 0.6~ 0.7 | 0.8~ 0.9 | 1.0~ 1.1 | 1.2~ 1.3 | 1.4~ 1.5 | 1.6~ 1.7 |
|---|---|---|---|---|---|---|---|---|---|
| Weather resistance | X$^{(2)}$ | ○ | ○ | ○ | ○ | ○ | ○ | ○ | X$^{(2)}$ |

○: No changes observed in the lens.
X$^{(1)}$: Cracking observed.
X$^{(2)}$: Peeling observed.

As shown by Table 2, if the thickness of the protective film 13 is too great, the internal stress increases to the point that cracking occurred in the protective film at the conclusion of the heat resistance test, while peeling of the protective film occurred at the conclusion of the weather resistance test. On the other hand, if the film thickness is too small, it is no longer capable of performing the required function as a protective film.

In the aforementioned projection-type headlamp 1, the ultraviolet component contained in the light rays radiated from the discharge lamp bulb 8 is absorbed by the ultraviolet absorbing film 12. Therefore, the resin outer lens 3 is not discolored (yellowing) nor otherwise deteriorated by ultraviolet irradiation. Furthermore, the protective film 13 serves to improve the endurance of the ultraviolet absorbing film 12, which is thereby kept from being in contact and reacting with the discharge gas. As a result, the ultraviolet absorbing function is retained over an extended service period.

It is to be understood that the specific configuration and structure of the respective elements of the aforementioned embodiment are merely examples of the present invention, and that the scope and spirit of the present invention are not determined or limited thereby.

As is evident from the above description, a vehicular headlamp employing a synthetic resin outer lens through which light rays emitted from a light source via a glass projection lens are radiated is characterized in that an ultraviolet absorbing film made solely of zinc oxide is formed on the inner surface of the projection lens.

As a result, in the vehicular headlamp of the present invention, ultraviolet irradiation from the light source is absorbed by the ultraviolet absorbing film, preventing discoloration and deterioration of the lens. Moreover, the provision of the protective film over the ultraviolet absorbing film allows the latter to retain its ultraviolet absorbing effect for an extended service period so that the transparency of the lens is also maintained. Therefore, light distribution control can be more easily effected.

Preferably, the film thickness of the ultraviolet absorbing film is in a range from 0.5 $\mu$m to 0.7 $\mu$m so that the ultraviolet irradiation can be absorbed most efficiently and excellent endurance can also be obtained.

A protective film made of an inorganic material is formed over the ultraviolet absorbing film so as to improve the endurance thereof. The protective film serves to prevent the ultraviolet absorbing film from being in contact and reacting with gases generated within the lamp unit, thus retaining the ultraviolet absorbing function for an extended service period.

The aforementioned ultraviolet absorbing film is formed of a sintered body of zinc oxide. This makes it possible to form the ultraviolet absorbing film made soley of zinc oxide easily.

What is claimed is:

1. A vehicular headlamp comprising:

an outer lens made of a synthetic resin, a light source emitting light containing ultraviolet radiation, an inner glass lens through which light rays emitted from said light source are radiated to said outer lens, and a sintered ultraviolet absorbing film consisting solely of zinc oxide formed on an inner surface of said inner glass lens.

2. The vehicular headlamp according to claim 1, wherein the thickness of said ultraviolet absorbing film is in a range of 0.5 $\mu$m to 0.7 $\mu$m.

3. The vehicular headlamp according to claim 1, wherein said ultraviolet absorbing film is formed by the steps of:

dispersing zinc oxide in a solvent;

applying said zinc oxide dispersed in said solvent to said inner surface of said glass lens; and heating said lens for a period of time sufficient to evaporate said solvent and produce a sintered film of zinc oxide.

4. The vehicular headlamp of claim 3, wherein said step of heating is performed at a temperature of the order of 500° C. for approximately 30 minutes.

5. The vehicular headlamp according to claim 1, further comprising a protective film made of an inorganic material formed over said ultraviolet absorbing film.

6. The vehicular headlamp according to claim 5, wherein said protective film is made of silicon dioxide.

7. The vehicular headlamp according to claim 6, wherein the thickness of said protective film is in a range of 0.2 to 1.5 $\mu$m.

8. The vehicular headlamp according to claim 5, wherein said protective film is formed over said ultraviolet absorbing film by a spin coating method.

* * * * *